3,374,174
COMPOSITION
William M. Le Suer, Cleveland, Ohio, assignor to The Lubrizol Corporation, Wickliffe, Ohio, a corporation of Ohio
No Drawing. Filed Apr. 12, 1966, Ser. No. 541,963
11 Claims. (Cl. 252—51.5)

ABSTRACT OF THE DISCLOSURE

Nitrogen-containing compositions obtained from the reaction of an amine with a high molecular weight carboxylic acid such as a monocarboxylic acid and an alkylene or arylene dicarboxylic are useful in lubricants.

This invention relates to high molecular weight carboxylic compounds and a method of preparing the same. Carboxylic compounds such as imides, amidines, and amides are useful in a wide variety of applications. Those which have relatively high molecular weights are useful particularly in organic compositions such as resins, plastics, paints, greases, herbicides, insecticides, fuels, lubricants, etc. A great deal of interest exists in such compounds and methods by which such compounds can be prepared.

Accordingly it is an object of this invention to provide relatively high molecular weight carboxylic compounds.

It is another object of this invention to provide a method of preparing relatively high molecular weight carboxylic compounds.

It is another object of this invention to provide fuel compositions such as gasolines, diesel fuels, aviation fuels.

It is another object of this invention to provide lubricating compositions such as internal combustion engine lubricants, gear lubricants, transmission lubricants, etc.

These and other objects are attained by providing a nitrogen-containing composition prepared by the process which comprises reacting an amine with (A) a high molecular weight carboxylic reactant obtained by the reaction of a halogenated aliphatic hydrocarbon having a molecular weight of at least about 100 with an alpha,beta-unsaturated monocarboxylic acid-producing compound and (B) a dicarboxylic reactant having the formula

R(COOH)$_2$ wherein R is alkylene or arylene, or the corresponding ester, halide, or anhydride of said acid.

THE AMINE REACTANT

The amines useful in the invention, for the most part, are alkyl amines, hydroxyalkyl amines and alkylene amines. The alkylene amines conform for the most part to the formula

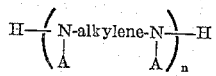

wherein $n$ is an integer preferably less than about 10, A is a substantially hydrocarbon or hydrogen radical, and the alkylene radical is preferably a lower alkylene radical having less than about 8 carbon atoms. The alkylene amines include principally methylene amines, ethylene amines, butylene amines, propylene amines, pentylene amines, hexylene amines, heptylene amines, octylene amines, other polymethylene amines, and also the cyclic and the higher homologs of such amines such as piperazines and aminoalkyl-substituted piperazines. They are exemplified specifically by: ethylene diamine, triethylene tetramine, propylene diamine, decamethylene diamine, octamethylene diamine, di(heptamethylene)triamine, tripropylene tetramine, tetraethylene pentamine, trimethylene diamine, pentaethylene hexamine, di(trimethylene) triamine, 2 - heptyl 3 - (2 - aminopropyl)imidazoline, 4-methylimidazoline, 1,3 - bis - (2-aminoethyl)imidazoline, pyrimidine, 1-(2-aminopropyl)piperazine, 1,4 - bis - (2-aminoethyl)piperazine, N,N-dimethylaminopropyl amine, N,N-dioctylethylamine, N-octyl-N'-methylethylene diamine and 2-methyl-1-(2-aminobutyl)piperazine. Higher homologs such as are obtained by condensing two or more of the above illustrated alkylene amines likewise are useful.

The ethylene amines are especially useful. They are described in some detail under the heading "Ethylene Amines" in "Encyclopedia of Chemical Technology," Kirk and Othmer, volume 5, pages 898–905, Interscience Publishers, New York (1950). Such compounds are prepared most conveniently by the reaction of an alkylene chloride with ammonia. The reaction results in the production of somewhat complex mixtures of alkylene amines, including cyclic condensation products such as piperazines. These mixtures find use in the process of this invention. On the other hand, quite satisfactory products may be obtained also by the use of pure alkylene amines. An especially useful alkylene amine for reasons of economy as well as effectiveness of the products derived therefrom is a mixture of ethylene amines prepared by the reaction of ethylene chloride and ammonia and having an average of from 2 to about 10 amino groups per molecule.

Hydroxyalkyl-substituted alkylene amines, i.e., alkylene amines having one or more hydroxyalkyl substituents on the nitrogen atoms, likewise are contemplated for use herein. The hydroxyalkyl-substituted alkylene amines are preferably those in which the alkyl group is a lower alkyl group, i.e., having less than about 6 carbon atoms. Examples of such amines include N-(2-hydroxyethyl)ethylene diamine, N,N'-bis(2-hydroxyethyl)ethylene diamine, 1-(2-hydroxyethyl)piperazine, mono-hydroxypropyl-substituted diethylene triamine, 1,4-bis(2-hydroxypropyl)piperazine, di - hydroxypropyl - substituted tetraethylene pentamine, N-(3-hydroxypropyl)tetramethylene diamine, and 2-heptadecyl-1-(2-hydroxyethyl)imidazoline.

Higher homologs such as are obtained by condensation of the above-illustrated alkylene amines or hydroxyalkyl-substituted alkylene amines through amino radicals or through hydroxy radicals are likewise useful. It will be appreciated that condensation through amino radicals results in a higher amine accompanied with removal of ammonia and that condensation through the hydroxy radicals results in products containing ether linkages accompanied with removal of water.

Other amines include primary, secondary and tertiary-amines such as monoalkyl, dialkyl, or trialkyl amines and also hydroxy-alkyl amines such as mono- and di(hydroxy-alkyl)amines. Examples of such amines include methylamine, dimethylamine, triethylamine, octylamine, N-octylmethylamine, N,N-dibutylamine, cyclohexylamine, N-methylcyclopentylamine, didodecylamine, ethanolamine, diethanolamine, dipropanolamine, etc. Such amines preferably contain up to about 30 carbon atoms in each alkyl group.

THE HIGH MOLECULAR WEIGHT CARBOXYLIC REACTANT

The high molecular weight carboxylic reactant is formed by the reaction of a halogenated hydrocarbon with an alpha,beta-unsaturated acid-producing compound. The halogenated hydrocarbon is preferably a halogenated olefin polymer such as a chlorinated or brominated olefin polymer. Iodinated olefin polymers likewise are useful. The halogenated olefin polymers are preferably derived from polymers of alkenes such as monoolefins having from 2 to 30 carbon atoms, particularly the homopolymers and interpolymers of 1-monoolefins having from 2 to 5 carbon atoms, such as ethylene, propene, 1-butene, isobutene, 1-hexene, 1-octene, 2-methyl-1-heptene, 3-cyclohexyl-1-butene and 2-methyl-5-propyl-1-hexene. They may be derived from polymers of medial olefins, i.e., olefins in which the olefinic linkage is not at the terminal position, such as 2-butene, 3-pentene and 4-octene. Those derived from polymers of lower 1-monoolefins, i.e., having less than about 6 carbon atoms, are especially useful.

Interpolymers of the above illustrated olefins with other interpolymerizable unsaturated substances such as aromatic olefins, cyclic olefins and polyenes are also useful to form the halogenated olefin polymers of the above process. Such interpolymers include, for example, those prepared by polymerizing isobutene with styrene; isobutene with butadiene; propene with isoprene; ethylene with piperylene; isobutene with chloroprene; isobutene with p-methylstyrene; 1-hexene with 1,3-hexadiene; 1-octene with 1-hexene; 1-heptene with 1-pentene; 3-methyl-1-butene with 1-octene; 3,3-dimethyl - 1-pentene with 1-hexene; isobutene with styrene and piperylene, etc.

The relative proportions of the monoolefins to the other polymerizable monomers in the interpolymers should be such that the interpolymers are substantially aliphatic and substantially saturated, i.e., they should contain at least about 80 percent, preferably at least about 95 percent, on a weight basis of units derived from the aliphatic monoolefins and no more than about 5 percent of olefinic linkages based on the total number of carbon-to-carbon covalent linkages.

Specific examples of such interpolymers include the copolymer of 95 percent (by weight) of isobutene with 5 percent of styrene; the terpolymer of 98 percent of isobutene with 1 percent of piperylene and 1 percent of chloroprene; the terpolymer of 95 percent of isobutene with 2 percent of 1-butene and 3 percent of 1-hexene; the terpolymer of 60 percent of isobutene with 20 percent of 1-pentene and 20 percent of 1-octene; the copolymer of 80 percent of 1-hexene and 20 percent of 1-heptene; the terpolymer of 90 percent of isobutene with 2 percent of cyclohexene and 8 percent of propene; and the copolymer of 80 percent of ethylene and 20 percent of propene.

Polymers of butene, particularly isobutene, are preferred. Such polymers are conveniently obtained by polymerizing a butene such as isobutene by the use of a Friedel-Crafts polymerization catalyst such as aluminum chloride, boron trifluoride, titanium tetrachloride or the like. When commercial isobutene is used in the polymerization, the polymer may contain a small amount of polymerized units of 1-butene or 2-butene which often is present in the commercial isobutene. For the purposes of this invention, a polyisobutene may thus contain small proportions of polymerized or interpolymerized 1-butene or 2-butene.

The polymers useful herein have molecular weight of at least about 100, preferably from about 250 and up to about 100,000. Still higher molecular weight polymers are useful and are often preferred because of their viscosity properties. Especially useful polymers are those having molecular weights ranging from about 700 to 5000, such as molecular weights of 600, 800, 1900, 3000, etc.

The halogenated olefin polymers are most conveniently prepared by treating a suitable olefin polymer with a halogenating agent such as chlorine, bromine, iodine, N-bromosuccinimide and N-chlorophthalimide. The treatment can be carried out simply by contacting the olefin polymer with the halogenating agent at a temperature about 50° C., preferably from about 80° C. and up to about 120° C. or 250° C. or any temperature below the decomposition point of the reaction mixture. The relative amounts of the olefin polymer and a halogenating agent used in the treatment are such that at least about one atomic proportion of halogen is incorporated into the polymeric molecule. Such amounts, in most instances, are 1 mole of the olefin polymer and at least about 1 mole of the halogenating agent. Halogenated polymers useful herein may contain 2 or more, such as 10, atomic proportions of halogen in the polymeric molecule, especially in instances where the polymer is of relatively high molecular weight such as 1000 or higher. In some instances, the halogen content of such halogenated polymer is from about 0.1% to 15% by weight, preferably from about 2% to about 8%. To form such highly halogenated polymers, two or more moles of the halogenating agent are used for each mole of the olefin polymer to be halogenated.

For example, the chlorinated or brominated olefin polymers are formed by treating the polymer with chlorine or bromine at the desired temperature for a sufficient time to form a product of the desired chlorine or bromine content. The treatment may be carried out in the presence of a solvent such as carbon tetrachloride, chloroform, chlorobenzene, etc. It is accompanied by the formation of hydrogen chloride or hydrogen bromide which may simply be allowed to escape from the reaction mixture as the treatment proceeds. The precise chemical composition of the halogenated olefin polymer is not known. It is known, however, that such product may contain one or more chlorine or bromine substituents and is useful as a reactant in the above process for preparing the high molecular weight carboxylic compounds of the invention.

The method by which the halogen is incorporated into the olefin polymer is not critical. Hence any method available for halogenating olefin polymers may be used and products of such halogenation are contemplated for use as reactants in the above process.

The halogenated reactants useful to prepare the high molecular weight carboxylic compounds of the invention include also hydrocarbon halides which are characterized by the substantial absence of an alpha-hydrogen substituent, i.e., a hydrogen substituent attached to the carbon atom which is alpha, or adjacent, to the halogen-bearing carbon atom. Such hydrocarbon halides include, for example, 2,2,4,4 - tetramethyl - 3 - pentyl chloride, 3,5 - dimethyl - 3,5 - diethyl - 4 - hexyl chloride, 5 - methyl - 5-ethyl - 7 - butyl - 7 - propyl - 6 - undecyl bromide, 2,2,4,4-tetramethyl-3-heptadecyl chloride, 4,4-diethyl-6,6-dicyclohexyl - 5 - triacontanyl chloride, 9,9,11,11 - tetrapentyl-10-heptacontanyl chloride, or a like halide having a molecular weight of at least about 100 such as is indicated previously.

A particularly useful class of such hydrocarbon halides are the chlorinated polyisobutenes obtained by treating a polyisobutene with a halogenating agent such as chlorine, bromine, iodine, N-bromosuccinimide, N-chlorophthalimide or any other halogenating agent. Because of the particular structural composition of polyisobutene, its halogenated derivative is unique in that it is substantially free of an alpha-hydrogen substituent.

The alpha,beta-unsaturated monocarboxylic acid-producing compound useful in the present invention may be the acid, ester, amide, imide, ammonium salt, or halide. It preferably contains less than about 12 carbon atoms. Examples of such monocarboxylic acids include for example, acrylic acid, methacrylic acid (i.e., alpha-methylacrylic acid), crotonic acid, cinnamic acid, alpha-ethylacrylic acid, alpha-phenylacrylic acid, alpha-octylacrylic acid, beta-propylacrylic acid, beta-octylacrylic acid, beta-cyclohexylacrylic acid, alpha-cyclopentylacrylic acid, beta-decylacrylic acid, alpha-methyl-beta-pentylacrylic acid, alpha-propyl-beta-phenylacrylic acid, alpha-chloroacrylic acid, alpha-bromoacrylic acid, beta-chloroacrylic acid, alpha-chlorocrotonic acid, isocrotonic acid, alpha-methylcrotonic acid, alpha-methylisocrotonic acid, beta,beta-dichloroacrylic acid, etc. Esters of such acids, especially those in which the ester group is derived from a lower alkanol (i.e., having less than about 8 carbon atoms) likewise are useful in the invention. Specific examples of such esters include methyl acrylate, methyl methacrylate, ethyl acrylate, cyclohexyl acrylate, cyclopentyl methacrylate, neopentyl alpha-phenylacrylate, hexyl alpha-propyl-beta-propylacrylate, octyl beta-decylacrylate and the like. Other esters such as those derived from other alcohols (e.g., decyl alcohol, epichlorohydrin, beta-chloro-ethanol, dodecyl alcohol, and 4-bromo-1-decanol) are also contemplated. Still other esters which are useful in the invention are exemplified by those derived from phenolic compounds including phenol, naphthol, cresol, o-butylphenol, m-heptylphenol, p-tertiary butylphenol, o,p-diisopropylphenol, alpha-decyl-beta-naphthol, p-dodecylphenol, and other alkyl phenols and alkyl naphthols in which the alkyl substituent preferably has less than about 12 carbon atoms.

The halides of the alpha-beta-unsaturated monocarboxylic acids are principally the chlorides and bromides. They are illustrated by acrylyl chloride, methacrylyl bromide, alpha-phenylacrylyl chloride, beta-decylacrylyl chloride as well as the chlorides and bromides of the above illustrated acids. The amides and the ammonium salts of alpha,beta-unsaturated monocarboxylic acids include principally those derived from ammonia or a monoamine such as an aliphatic amine or an aryl amine. Such amines may be mono-, di-, or tri-alkyl or aryl amines such as methylamine, dimethylamine, trimethylamine, diethylamine, aniline, toluidine, decylamine, cyclohexylamine, dicyclohexylamine, triethylamine, melamine, piperazine, pyridine, N-methyloctylamine, N,N-diethylcyclohexylamine, o-butylaniline, p-decylaniline, etc. Again, the unsaturated acids from which the amides and ammonium salts of the above amines may be those illustrated previously. Imides of such acids derived from ammonia or a primary amine likewise are useful in the invention and the imides are formed by the replacement of 2 hydrogen atoms of ammonia or a primary amine with the carboxy radicals of the alpha,beta-unsaturated monocarboxylic acid. Likewise useful are the anhydrides of such monocarboxylic acids such as are formed by molecular dehydration of the acid. It should be noted that the above-noted acids and derivatives are capable of yielding the alpha,beta-unsaturated monocarboxylic acid and, for the sake of convenience, they are described by the generic expression "alpha,beta-unsaturated monocarboxylic acid-producing compound."

The reaction of the halogenated hydrocarbon and the alpha,beta-unsaturated monocarboxylic acid-producing compound can be effected simply by mixing the reactants at a suitable temperature such as 80° C. or above. The preferred temperature for the reaction is within the range from about 120° C. to 250° C. A higher temperature such as 300° C. or 350° C. may be used provided it does not exceed the decomposition point of the reaction mixture. The reaction may be carried out in the presence of an inert solvent or diluent such as mineral oil, cyclohexane, naphtha, chlorobenzene, benzene or toluene. The use of such a solvent is often advantageous where one or both of the reactants are solids, semi-solids or viscous liquids. The reaction proceeds readily upon mixing the reactants at a suitable temperature. It ordinarily is facilitated by mild agitation and is completed within a short time. In most instances the reaction is complete in less than about 30 hours. Upon completion of the reaction, the reaction mixture may be blown with an inert gas such as nitrogen at an elevated temperature such as 100° C. or higher or under reduced pressure to remove any volatile components. The product so obtained is the desired high molecular weight carboxylic compound. It may be purified if desired by distillation, extraction, precipitation or any such well-known technique.

The reaction between the halogenated hydrocarbon and the alpha,beta-unsaturated monocarboxylic acid-producing compound usually calls for the use of at least about one chemical equivalent of the acid-producing compound for each equivalent of the halogenated hydrocarbon. The equivalent weight of the acid is based on the number of carboxy radicals and that of the halogenated hydrocarbon is based on the number of halogen atoms in the molecule. For example, a monocarboxylic acid, ester or halide has one equivalent per mole. Similarly, the equivalent weight of a halogenated hydrocarbon can be determined from its halogen content.

More than 1 and up to about 5 equivalents of the acid-producing compound may be reacted with the halogenated hydrocarbon. An excess of either reactant may be used in the reaction and the excess of one reactant often facilitates the reaction and aids in the complete utilization of the other.

The precise mechanism of the reaction between the halogenated hydrocarbon and the alpha,beta-unsaturated monocarboxylic acid-producing compound is not known although it is known that the reaction involves the condensation of the olefinic linkage in the unsaturated acid with an activated group of the halogenated hydrocarbon. The activated group is directly associated with the presence of the halogen of the hydrocarbon reactant. It is further known that the structural composition of the halogenated hydrocarbon has a material influence. Thus, a halogenated hydrocarbon in which there is absent an alpha-hydrogen substituent in its molecular structure is especially desirable for use in the reaction with the unsaturated acid. Further, it is known that the product of the reaction is a high molecular weight carboxylic acid or an acid-producing derivative thereof in which the acid-producing group corresponds to that of the alpha,beta-unsaturated monocarboxylic acid-producing compound from which the final product is derived.

An alternative process for preparing the high molecular weight carboxylic reactant involves simultaneously forming the halogenated hydrocarbon and reacting the halogenated hydrocarbon with the alpha,beta-unsaturated monocarboxylic acid-producing compound. Such process is illustrated by preparing a mixture of the unsaturated acid-producing compound and the hydrocarbon reactant and contacting the mixture with a halogenating agent such as is illustrated previously. Such process is preferably carried out by preparing a mixture of the unsaturated acid-producing compound and the hydrocarbon at a relatively low tempearture (e.g., 50°–100° C.) and then introducing the halogenating agent into the mixture as the temperature of the reaction mixture is allowed to increase to, e.g., 150° C., 250° C. or higher.

THE DICARBOXYLIC REACTANT

The dicarboxylic reactant may be an aliphatic or aromatic dicarboxylic acid or the corresponding ester, halide, or anhydride. For the most part, the dicarboxylic acids useful herein conform to the formula

wherein R is alkylene or arylene and preferably contains up to about 12 carbon atoms. The aromatic dicarboxylic acids, i.e., those described by the above formula wherein R is arylene, include principally dicarboxy-substituted benzene, naphthalene, anthracene, phenanthrene, or a like aromatic hydrocarbon. They include also hydrocarbon-substituted or polar-substituted derivatives of the foregoing dicarboxy-substituted aromatic hydrocarbons. Thus the expression "arylene" is used in the generic sense and encompasses radicals which contain hydrocarbon substituents or polar substituents such as alkyl, aryl, chloro, bromo, iodo, nitro, alkoxy, keto, etc. The alkyl or aryl substituents may contain up to about 30 carbon atoms. Specific examples of the aromatic dicarboxylic acids are othophthalic acids, terephthalic acids, 2-methyl-benzene-1,3-dicarboxylic acid, naphthalene-1,4-dicarboxylic acid, anthracene dicarboxylic acid, phenanthrene-1,3-dicarboxylic acid, 3-dodecylbenzene-1,4-dicarboxylic acid, 2,5-dibutylbenzene-1,4-dicarboxylic acid, 3-chlorobenzene-1,4-dicarboxylic acid 3,5-dibromobenzene-1,4-dicarboxylic acid, 3-isobutyl-5-hexylbenzene-1,4-dicarboxylic acid, etc.

The aliphatic dicarboxylic acids include, for example, the dicarboxy-substituted alkanes and alkenes. Such acids are described by the above formula wherein R is an alkylene group. The expression "alkylene" likewise is used in a generic sense and encompasses radicals which may contain hydrocarbon substituents or polar substituents such as are illustrated previously. Specific examples of aliphatic dicarboxylic acids are malonic acid, succinic acid, maleic acid, adipic acid,, oaxlic acid, glutaric acid, azalic acid, sebacic acid, alpha-chloro-adipic acid, alpha,alpha'-dichloroadipic acid, beta-cyclohexyl suberic acid, beta,beta-dipentylpimelic acid, gamma-bromoadipic acid, methylsuccinic acid, itaconic acid, chloromaleic acid, isobutylsuccinic acid, dodecenylsuccinic behenylsuccinic acid, etc.

The anhydrides of the above dicarboxylic acids likewise are useful. They are exemplified by maleic anhydride, succinic anhydride, orthophthalic anhydride, naphthalene-1,2-dicarboxylic acid anhydride and the like. The halides, especially chlorides and bromides, of the dicarboxylic acids are also contemplated for use in the present invention; so also are the esters of such acids with phenols and alcohols. Especially useful esters are those derived from lower alcohols having up to about 8 carbon atoms or from lower alkyl-substituted phenols having up to about 8 aliphatic carbon atoms. The halides and esters of the dicarboxylic acids are illustrated by succinyl dichloride, maleyl dichloride, oxaleyl dibromide, monomethyl ester of succinic acid, dimethyl ester of dodecenylsuccinic acid, monomethyl ester of terephthalic acid, diethyl ester of terephthalic acid, dioctyl ester of terephthalic acid, dioctyl ester of maleic acid, diisobutyl ester of fumaric acid, etc.

PROCESS CONDITIONS

As indicated previously the nitrogen-containing composition of this invention is prepared by the reaction of the amine reactant with two carboxylic reactants, the one being a high molecular weight carboxylic reactant and the other being a dicarboxylic reactant. A preferred method of preparing the nitrogen-containing composition involves first forming an acylated amine intermediate by reacting the amine with the high molecular weight carboxylic reactant and then reacting the intermediate with the dicarboxylic reactant. The acylated amine intermediate is formed by mixing the amine and the high molecular weight carboxylic reactant at a temperature of at least about 80° C., preferably above about 100° C., and up to the decomposition point of the reaction mixture. The optimum reaction temperature ranges from about 100° C. to about 250° C. The product of such reaction is complex and contains amide, imide or amidine linkages and may contain some salt linkages. In most instances the product contains a mixture of such linkages. The acylated amine intermediate is then mixed with a suitable amount of the dicarboxylic reactant at a temperature ranging from about 0° C. to the decomposition point of the reaction mixture. The preferred temperature is within the range of from about 100° C. to 250° C.

The formation of the acylated amine intermediate and the reaction of the acylated amine intermediate with the dicarboxylic reactant may be effected in the presence of a solvent or diluent such as benzene, naphtha, xylene, dioxane, ethylene dichloride, chlorobenzene or mineral oil. The solvent or diluent helps in the control of the reaction temperature and facilitates the mixing of the reactants.

An alternative method of preparing the nitrogen-containing composition involves preparing a mixture of the high molecular weight carboxylic reactant and the di-dicarboxylic reactant and then reacting the mixture with the amine at a suitable temperature such as above 80° C., preferably from about 100° C. to about 250° C. Another alternative method involves reacting the amine first with the dicarboxylic reactant to form an intermediate and then reacting the intermediate with the high molecular weight carboxylic reactant at a temperature such as is indicated previously.

The relative amounts of the reactants useful in preparing the nitrogen-containing composition of this invention are such that at least about 0.5 equivalent of the amine is used for each equivalent of the high molecular weight carboxylic reactant and then from about 0.1 to about 1 equivalent of the dicarboxylic reactant is used for each equivalent of the amine. In most instances no more than about 2 moles of the amine are used per equivalent of the high molecular weight carboxylic reactant. A larger amount of the amine may be used, but the excess does not have any attendant advantages. The preferred amounts of the reactants are from about 1 to 5 equivalents of the amine and from about 0.1 to 2 equivalents of the dicarboxylic reactant for each equivalent of the high molecular weight carboxylic reactant.

The equivalent weight of the amine is based on the number of amino groups per radical and the equivalent weight of the carboxylic reactant is based on the number of carboxylic groups per molecule. To illustrate, ethanolamine has one equivalent per mole, ethylene diamine has two equivalents per mole and tetraethylene pentamine has five equivalents per mole. A dicarboxylic reactant, on the other hand, has two equivalents per mole; that is, its equivalent weight is one-half its molecular weight. The equivalent weight of the amine can be calculated from its nitrogen content and the equivalent weight of the carboxylic reactant can be calculated from its acidity or potential acidity as measured by its neutralization or saponification equivalents.

The precise chemical constitution of the nitrogen-containing composition of this invention is not known. It is known, however, that the product of the above process is a complex mixture containing, for example, salts, amides, imides, or amidines formed by the reaction of the carboxy acid radicals of the carboxylic reactants with the amino groups of the amine reactant. The composition of the product depends to some extent on the reaction conditions under which the product is formed. Thus, a product formed by the treatment of an acylated amine intermediate with a dicarboxylic reactant at a temperature below about 100° C. contains predominantly salt linkages whereas a product formed at a temperature above about 100° C. contains predominantly amide, imide, or amidine linkages.

The following examples illustrate the process of the present invention.

Example 1

A high molecular weight carboxylic acid is prepared by heating a chlorinated polyisobutene having a molecular weight of 350 and a chlorine content of 11.7% (7000 grams) and acrylic acid (1440 grams) at 180°–230° C. while hydrogen chloride is evolved from the reaction mixture. The reaction mixture is then heated at 210° C./12 mm. and filtered. The filtrate is the desired acid having a chlorine content of 0.35% and an acid number of 114. A mixture of 3605 grams (7 equivalents) of the above high molecular weight carboxylic acid, 287 grams (7 equivalents) of a commercial polyethylene polyamine having an average composition corresponding to that of tetraethylene pentamine, and 2500 grams of mineral oil is prepared and heated to 200° C. while water is being distilled off. The reaction mixture is heated to 170° C./20 mm., washed with aqueous propanol and again heated to 150° C./20 mm. The residue is filtered and the filtrate is a 40% mineral oil solution of an acylated polyamine having a nitrogen content of 1.54%. The filtrate is mixed with glutaric acid (1 equivalent, i.e., 0.5 mole) and the mixture is heated at 100°–150° C. for 2 hours and then filtered. The filtrate is the desired product.

Example 2

A chlorinated polyisobutene having a molecular weight of 1000 and a chlorine content of 4.3% (605 parts by weight, 0.73 equivalent of chlorine) is mixed with acrylic acid (66 parts, 0.92 equivalent) and the mixture is heated at 120°–225° C. while hydrogen chloride is evolved. It is then heated at 205° C./10 mm. and then filtered. The filtrate is an acid having a chlorine content of 0.18% and an acid number of 50.5. A mixture of 284 parts of mineral oil, 388 parts (0.35 equivalent) of the above carboxylic acid and 44 parts (1.05 equivalents) of a commercial pentaethylene hexamine is heated at 219° C. while water is being distilled off. Terephthalic acid (37.4 parts, 0.45 equivalent) is added to the mixture and the resulting mixture is heated at 146°–152° C. and filtered. The mixture is then filtered. The filtrate is a mineral oil solution of the desired product having a nitrogen content of 1.99%.

Example 3

To a mixture of 626 grams of mineral oil and 1400 grams of the high molecular weight carboxylic compound obtained by reacting equivalent amounts of the chlorinated polyisobutene of Example 2 and acrylic acid, there is added at 60°–200° C. 126 grams of pentaethylene hexamine throughout a period of 1 hour. The resulting mixture is blown with nitrogen at 200°–215° C. for 2.5 hours and then filtered. The filtrate is a mineral oil solution of an acylated polyamine having a nitrogen content of 1.69%. A mixture of 970 grams of the above solution and 30 grams of terephthalic acid is heated at 150°–160° C. and filtered. The filtrate is the desired product having a nitrogen content of 1.63%.

Example 4

A polyisobutene having a molecular weight of 440 (3000 grams) is chlorinated at 95°–105° C. (by passing chlorine into the polyisobutene) until 242 grams of chlorine is incorporated into the polymer. The chlorinated polymer is blown with nitrogen at 100° C. and mixed with acrylic acid (613 grams, 8.4 equivalents). The mixture is heated at 165°–199° C. for 20 hours and then at 215° C./25 mm. to distill off volatile components. The residue is cooled to 160° C. and filtered. The filtrate is the desired acid having a chlorine content of 0.31% and an acid number of 82. A mixture of 500 grams of xylene, 30 grams (1 equivalent) of ethylene diamine and 630 grams (1 equivalent) of the above carboxylic compound is heated at 145 C. while water is being distilled off azeotropically. The reaction mixture is then heated to 150° C./15 mm. to remove volatile components, mixed with 525 grams of mineral oil and filtered. The filtrate (a mineral oil solution having a nitrogen content of 1.08%) is mixed with 0.1 equivalent (per equivalent of nitrogen) of o-butyl-terephthalic acid at 100°–120° C. to form the desired product.

Example 5

A commercial polyethylene polyamine (nitrogen content of 34%) is reacted with the high molecular weight carboxylic compound of Example 2 (2 equivalents per equivalent of nitrogen) in mineral oil. The resulting product (600 grams) is heated at 150–160° C. with terephthalic acid (18 grams) and filtered. The filtrate is a mineral oil solution of an acylated amine having a nitrogen content of 1.27%.

Example 6

The procedure of Example 2 is repeated except that the chlorinated polyisobutene used has a molecular weight of 100,000 and a chlorine content of 2.5% and the amine used is hexamethylene diamine.

Example 7

The procedure of Example 2 is repeated except that the chlorinated polyisobutene is replaced on a chlorine equivalent basis with a chlorinated copolymer of iso-butene (95% by weight) and styrene (5% by weight) having a molecular weight of 3000 and a chlorine content of 1.5%; the amine used is N-aminoethyl piperazine; and the terephthalic acid is replaced with succinic acid.

Example 8

A high molecular weight carboxylic reactant is prepared by the procedure of Example 2 except that the chlorinated isobutene is replaced on a halogen equivalent basis with a brominated copolymer in isobutene (98% by weight) and isoprene (2% by weight) having a molecular weight of 5000 and a bromine content of 2.5 and that the acrylic acid used is replaced on a chemical equivalent basis with phenyl acrylate. A mixture of octylamine (2 equivalents) and the above carboxylic compound (1 equivalent) is diluted with an equal volume of xylene and heated at the reflux temperature until no more water distills. The mixture is blended with an equal volume of mineral oil and heated at 150°–170° C./2 mm. to remove volatile components. The residue is mixed with 0.5 equivalent of maleic anhydride at 100°–120° C. for 2 hours. The residue is filtered and the filtrate is an oil solution of the desired product.

Example 9

A mixture of octyl acrylate (1 equivalent) and a chlorinated polyethylene having a molecular weight of 1500 and a chlorine content of 0.5% (1 equivalent of chlorine) is heated at 150°–250° C. for 15 hours. The reaction mixture is then heated at 200° C./2 mm. and filtered. The filtrate is mixed with a blend of pentaethylene hexamine (5 equivalents) and the polyisobutene substituted succinic anhydride of Example 1 (1 equivalent) at 150°–200° C. for 10 hours. The residue is filtered and the filtrate is the desired product.

Example 10

A mixture of crotonic acid (2 equivalents) and a chlorinated polypropene having a molecular weight of 2500 and a chlorine content of 5% (0.5 equivalent of chlorine) is heated at 180°–220° C. for 5 hours and then at 200° C./1 mm. The residue is mixed with an equal volume of xylene and a blend of butylamine (2.5 equivalents) and sebacic acid (0.5 equivalent) at 150°–225° C. for 6 hours. The residue is filtered.

Example 11

The procedure of Example 2 is repeated except that the high molecular weight carboxylic reactant is derived from a chlorinated polyisobutene having a molecular weight of 60,000 and a chlorine content of 3% and the terephthalic acid is replaced on a chemical equivalent basis with malonic acid.

Example 12

A high molecular weight carboxylic reactant is prepared by the procedure of Example 2 except that the chlorinated polyisobutene used is replaced on a halogen equivalent basis with a brominated polyisobutene having a molecular weight of 20,000 and a bromine content of 3% and that the acrylic acid used is replaced on a chemical equivalent basis with cinnamic acid. A mixture of this acid (1 equivalent) and diphenic acid (0.1 equivalent) is blended with N-octadecyl-propylene diamine (2 equivalents) at 120°–190° C. for 5 hours and filtered.

Example 13

A methyl ester of a high molecular weight monocarboxylic acid is prepared by heating an equi-molar mixture of a chlorinated polyisobutene having a molecular weight of 1000 and a chlorine content of 4.7% by weight and methyl methacrylate at 140°–220° C. It is mixed with a stoichiometrically equivalent amount of triethylene tetramine at 100°–200° C. and then with dimethyl octenyl-succinate (0.1 equivalent per equivalent of nitrogen) at 80°–150° C. for 3 hours.

Example 14

A mixture of a chlorinated polyisobutene having a molecular weight of 350 and a chlorine content of 10.3% and acrylic acid (1 equivalent per equivalent of chlorine of the chlorinated polyisobutene) is heated at 150°–210° C. while hydrogen chloride is evolved from the reaction mixture. It is then heated at 170°–210° C./35 mm. and filtered. The filtrate is the desired acid having a chlorine content of 0.35% and an acid number of 116. A mixture of 375 grams of mineral oil, 515 grams (1 equivalent) of the above carboxylic compound and 66 grams (1 equivalent) of an acrolein-ammonia molar ratio of (1:1) interpolymer having a nitrogen content of 23% by weight is heated at 150°–220° C. whereupon 16 grams of water is distilled off. The reaction mixture is washed with aqueous propanol, heated to 150° C./15 mm. and filtered. The filtrate is a mineral oil solution of an acylated amine having a nitrogen content of 1.26%. A mixture of this acylated amine and 0.1 equivalent of ortho-phthalic anhydride is heated at 90° C. for 2 hours and filtered.

Example 15

A high molecular weight acid is prepared by heating 3600 grams of a chlorinated polyisobutene having a molecular weight of 1000 and a chlorine content of 4.3% and 425 grams of acrylic acid at 147°–225° C. and then at 100° C./18 mm. and then filtering the reaction mixture. The acid has a chlorine content of 0.35% and an acid number of 56. A mixture of 760 grams of mineral oil, 128 grams of N-aminoethyl pyrrolidone and 1007 grams of the above carboxylic compound is heated at 200° C. whereupon water is distilled off from the reaction mixture. The residue is filtered and the filtrate is a 40% mineral oil solution of an acylated amine having a nitrogen content of 1.12%. The residue is then treated with 0.05 equivalent of ortho-phthalic acid at 100°–120° C. for 1 hour.

Example 16

A mixture of acrylic acid (66 parts by weight) and the chlorinated polyisobutene of Example 2 (605 parts) is prepared at 55° C. The mixture is heated to 183° C. in 4 hours whereupon a solution of iodine (0.15 part) in carbon tetrachloride (13 parts) is added to the reaction mixture while the mixture is heated at 183°–224° C. for 12 hours. The mixture is then heated at 202°–208° C./10 mm. and then filtered. The filtrate is the desired acid having a chlorine content of 0.26% and an acid number of 56. A mixture of 439 grams of ethanolamine and 2900 grams of the acyl chloride of the above carboxylic compound (prepared by treating the acid with $PCl_3$) is prepared at 100°–130° C. The mixture is then blown with nitrogen at 200° C. while water is being distilled off. The residue is mixed with 2190 grams of mineral oil and filtered. The filtrate is then mixed with 0.1 equivalent of terephthalic acid at 80°–90° C. for 10 hours.

Example 17

A high molecular weight carboxylic reactant is obtained by the procedure of Example 3 except that the acrylic acid is replaced on a chemical equivalent basis with butyl acrylate. A mixture of 1 equivalent of diethanolamine and 1 equivalent of the above carboxylic compound is blended with an equal weight of mineral oil and the resulting mixture is heated at 150°–200° C. for 8 hours. The mixture is filtered and the filtrate is treated with 0.01 equivalent of chloromaleic acid at 80°–150° C. for 6 hours.

Example 18

A high molecular weight carboxylic reactant is obtained by the procedure of Example 3 except that the acrylic acid is replaced on a chemical equivalent basis with propyl alpha-chloroacrylate. A mixture of 2 equivalents of cyclohexylamine and 1.5 equivalents of the above carboxylic compound is diluted with an equal weight of xylene and the resulting mixture is heated at the reflux temperature until no more water distills. The residue is treated with 0.1 equivalent of itaconic acid at reflux temperature for 8 hours and filtered.

Example 19

A high molecular weight carboxylic reactant is obtained by the procedure of Example 3 except that the acrylic acid is replaced on a chemical equivalent basis with beta-ethyl acrylic acid. A mixture of 1 equivalent of dimethylamine and 1 equivalent of the above carboxylic compound is blended with an equal weight of mineral oil and the resulting mixture is heated at 180°–220° C. for 6 hours. The residue is treated with 0.1 equivalent of itaconic anhydride at 100°–120° C. for 6 hours.

Example 20

A high molecular weight carboxylic reactant is obtained by the procedure of Example 3 except that the acrylic acid is replaced on a chemical equivalent basis with alpha-butyl acrylic acid. A mixture of 3 equivalents of melamine and 1 equivalent of the above carboxylic compound is blended with an equal weight of mineral oil and the resulting mixture is heated at 150°–180° C. for 6 hours. The residue is treated with 0.5 equivalent of butylmalonic acid at 80°–120° C. for 5 hours.

Example 21

A high molecular weight carboxylic reactant is obtained by the procedure of Example 3 except that the acrylic acid is replaced on a chemical equivalent basis with beta-octyl methacrylic acid. A mixture of 1 equivalent of an N-hydroxyethyl-substituted tetraethylene pentamine and 1 equivalent of the above carboxylic compound is diluted with an equal weight of mineral oil and the resulting solution is heated at 180°–250° C. for 6 hours. The residue is treated with 0.8 equivalent of dodecyl-terephthalic acid at 150°–180° C. for 4 hours and then filtered.

Example 22

A nitrogen-containing composition is prepared by a procedure similar to that of Example 2 by forming an acylated amine intermediate by the reaction of a high molecular weight carboxylic reactant (obtained by reacting an acrylic acid and the chlorinated polyisobutene of Example 2) and pentaethylene hexamine (2.5 equivalents per equivalent of the above carboxylic reactant), and then reacting the acylated amine intermediate (400 parts by weight) with terephthalic acid (12.3 parts) at 150–160° C. The resulting product has a nitrogen content of 1.78%.

The oil-soluble nitrogen compositions of this invention are useful for a wide variety of purposes. They are useful in, for example, plastics such as polyvinyl chlorides; paints; petroleum crudes which are subjected to thermal fractionation; water-in-oil emulsions such as are used as hydraulic fluids; oil-in-water emulsions; etc. They are especially useful as additives in hydrocarbon compositions and lubricating compositions such as gasolines, furnace oils, engine lubricants, greases, cutting oils, transformer oils, etc. When used in fuels such as gasolines or furnace oils, the oil-soluble nitrogen composition of this invention is usually present at concentrations ranging from about 0.0001% to about 2% by weight of the fuel whereas when used in lubricants or greases it is usually present at concentrations ranging from about 0.05% to about 10% by weight. In most instances, it should be present in a lubricant or grease in an amount sufficient to impart at least about 0.001%, preferably from about 0.005% to 0.1%, by weight of the aromatic dicarboxylic acid group of the nitrogen composition.

The present invention contemplates also the presence of other additives in fuels or lubricants in which there is present the oil-soluble nitrogen composition described hereinabove. Such other additives include, for instance, detergents of the ash-containing type, viscosity improving agents, pour point depressing agents, anti-foam agents, extreme pressure agents, rust-inhibiting agents, oxidation-inhibiting agents, friction-improving agents, and corrosion-inhibiting agents.

The ash-containing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium, and barium.

The term "basic salt" is used to designate the metal salts wherein the metal is present in stoichiometrically larger amounts than the organic acid radical. The commonly employed methods for preparing the basic salts involves heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, Cellosolve, Carbitol, ethylene glycol, stearyl alcohol, and cyclohexyl alcohol; amines such as aniline, phenylenediamine, phenothiazine, phenyl-beta-naphthylamine, and dodecylamine. A particularly effective method for preparing the basic salts comprises mixing an acid with an excess of a basic alkaline earth metal neutralizing agent, a phenolic promoter compound, and a small amount of water and carbonating the mixture at an elevated temperature such as 60°–200° C.

Extreme pressure agents and corrosion-inhibiting and oxidation-inhibiting agents are exemplified by chlorinated aliphatic hydrocarbons such as chlorinated wax; organic sulfides and polysulfides such as benzyl disulfide, bis(chlorobenzyl) disulfide, dibutyl tetrasulfide, sulfurized sperm oil, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates such as zinc di-octyl-dithiocarbamate, and barium heptylphenyl dithiocarbamate: Group II metal phosphorodithioates such as zinc dicyclohexylphosphorodithioate, zinc dioctylphosphorodithioate, barium di(heptylphenyl)phosphorodithioate, cadmium dinonylphosphorodithioate, and zinc salt of a phosphorodithioic acid produced by the reaction of phosphorus pentasulfide with an equimolar mixture of isopropyl alcohol and n-hexyl alcohol.

The lubricating compositions may also contain metal detergent additives in amounts usually within the range of about 0.1% to about 20% by weight. In some applications such as in lubricating marine diesel engines the lubricating compositions may contain as much as 30% of a metal detergent additive. They may also contain extreme pressure addition agents, viscosity index improving agents, and pour point depressing agents, each in amounts within the range of from about 0.1% to about 10%.

The following examples are illustrative of the lubricating compositions of this invention (all percentages are by weight):

Example A

SAE 20 mineral lubricating oil containing 0.5% of the product of Example 1.

Example B

SAE 30 mineral lubricating oil containing 0.75% of the product of Example 2 and 0.1% of phosphorus as the barium salt of di-n-nonylphosphorodithioic acid.

Example C

SAE 10W–30 mineral lubricating oil containing 0.4% of the product of Example 3.

Example D

SAE 90 mineral lubricating oil containing 0.1% of the product of Example 3 and 0.15% of the zinc salt of an equimolar mixture of dicyclohexylphosphorodithioic acid and diisobutyl phosphorodithioic acid.

Example E

SAE 30 mineral lubricating oil containing 2% of the product of Example 3.

Example F

SAE 20W–30 mineral lubricating oil containing 5% of the product of Example 4.

Example G

SAE 10W–30 mineral lubricating oil containing 1.5% of the product of Example 5 and 0.05% of phosphorus as the zinc salt of a phosphorodithioic acid prepared by the reaction of phosphorus pentasulfide with a mixture of 60% (mole) of p-butylphenol and 40% (mole) of n-pentyl alcohol.

Example H

SAE 50 mineral lubricating oil containing 3% of the product of Example 6 and 0.1% of phosphorus as the calcium salt of dihexylphosphorodithioate.

Example I

SAE 10W–30 mineral lubricating oil containing 2% of the product of Example 1, 0.06% of phosphorus as zinc di-n-octylphosphorodithioate, and 1% of sulfate ash as barium mahogany sulfonate.

The effectiveness of the nitrogen composition of this invention as a lubricant additive to minimize its corrosiveness is shown also by a Co-ordination Research Council engine test. This test, which employs a single cylinder, spark ignition engine, involves running the engine under constant speed, constant air-fuel ratio and constant flow conditions for a total of 40 hours after a break-in period of 4.5 hours. The weight loss of the copper-lead bearings after completion of the test is an indication of the relative corrosiveness of the lubricant treated. An SAE 30 mineral lubricant containing 0.52% by weight of the product of Example 22 passes the test and shows a result of 37.3 milligrams of the weight loss of the bearings.

The effectiveness of the nitrogen-containing composition of this invention as a detergent additive in lubricants subjected to severe operating conditions is shown by a Co-ordination Research Council engine test (designation L–1). In this test the lubricating composition is used in the crankcase of a 4-stroke diesel engine having a compression ratio of 15:1 operated for a specified period under the following conditions: speed, 1000 r.p.m.; B.t.u. input per minute, 2900–3000; load, 20 brake horsepower; water jacket outlet temperature, 175–180° F.; oil temperature, 140–150° F. A diesel fuel having a sulfur content of 1% is used. The lubrication composition is evaluated according to (1) the piston cleanliness (rating scale of 0–100, 100 being indicative of no deposit and 0 being indicative of heavy deposit) and (2) the amount of ring filling. An SAE 30 mineral lubricant containing 0.52% by weight of the product of Example 22 passes the test and shows the following result: piston cleanliness rating, 91.5; and amount of ring filling, 17%.

What is claimed is:

1. A nitrogen-containing composition prepared by the process which comprises reacting at a temperature of from about 80° C. up to about the decomposition point of the reaction mixture at least about 0.5 equivalent of an amine selected from the group consisting of alkyl amines, hydroxyalkyl amines, alkylene amines and hydroxyalkyl-substituted alkylene amines with 1 equivalent of (A) a high molecular weight carboxylic reactant obtained by the reaction of a halogenated aliphatic hydrocarbon having a molecular weight of at least about 100 with an alpha,beta-unsaturated monocarboxylic acid-producing compound selected from the group consisting of acids having up to about 12 carbon atoms and the anhydrides, acid halides, esters, amides, imides and ammonium salts thereof and from about 0.1 to about 1 equivalent, per equivalent of the amine, of (B) a dicarboxylic acid having the formula $$R(COOH)_2$$

wherein R is alkylene, arylene, substituted alkylene, or substituted arylene having up to about 30 carbon atoms in the substitutent, said substituent being selected from the group consisting of hydrocarbyl, chloro, bromo, iodo, nitro, alkoxy and keto, or the corresponding ester, halide, or anhydride of said acid.

2. The composition of claim 1 wherein the halogenated aliphatic hydrocarbon is a halogenated olefin polymer having a molecular weight within the range of from about 250 to about 100,000.

3. The composition of claim 1 wherein the halogenated aliphatic hydrocarbon is a halogenated polymer of isobutene, the alpha,beta-unsaturated monocarboxylic acid-producing compound is an acrylic or methacrylic acid or ester, and the amine is an alkylene polyamine.

4. The composition of claim 1 wherein the halogenated aliphatic hydrocarbon is a chlorinated polymer of isobutene having a molecular weight of from about 700 to about 5000 and a chlorine content of from about 2% to about 8%, the alpha,beta-unsaturated monocarboxylic acid-producing compound is acrylic acid, the amine is an ethylene polyamine having up to about 11 amino groups, and the dicarboxylic reactant is terephthalic acid.

5. The composition of claim 1 wherein the halogenated aliphatic hydrocarbon is a chlorinated polymer of isobutene having a molecular weight of from about 700 to about 5000 and a chlorine content of from about 2% to about 8%, the alpha,beta-unsaturated monocarboxylic acid-producing compound is alkyl acrylate, the amine is an ethylene polyamine having up to about 11 amino groups, and the dicarboxylic reactant is terephthalic acid.

6. A nitrogen-containing composition prepared by the process which comprises forming an acylated amine by reacting at a temperature of from about 80° C. up to about the decomposition point of the reaction mixture at least about 0.5 equivalent of an alkylene polyamine with 1 equivalent of a high molecular weight carboxylic reactant obtained by the reaction of a chlorinated olefin polymer having a molecular weight of from about 700 to about 5000 with an alpha,beta-unsaturated monocarboxylic acid having up to about 12 carbon atoms or a lower ester thereof and reacting said acylated amine with an arylene dicarboxylic acid at a temperature of from about 0° C. to the decomposition point of the reaction mixture.

7. The composition of claim 6 wherein the chlorinated olefin polymer is a chlorinated polymer of butene, the alpha,beta-unsaturated monocarboxylic acid is acrylic acid or methacrylic acid, and the arylene dicarboxylic acid is terephthalic acid.

8. A nitrogen-containing composition prepared by the process which comprises forming an acylated amine by reacting at a temperature of from about 100° C. to about 250° C. at least about 0.5 equivalent of a polyethylene polyamine having up to about 11 amino groups with 1 equivalent of a high molecular weight carboxylic reactant obtained by the reaction of a chlorinated polyisobutene having a molecular weight of from about 700 to about 5000 with acrylic acid or methacrylic acid and reacting said acylated amine with from about 0.1 to about 1 equivalent, per equivalent of the polyethylene polyamine, of terephthalic acid at a temperature of from about 100° C. to about 250° C.

9. A lubricating composition comprising a major proportion of a lubricating oil and a minor proportion of the nitrogen-containing composition of claim 1.

10. A lubricating composition comprising a major proportion of a lubricating oil and a minor proportion of the nitrogen-containing composition of claim 8.

11. A lubricating composition comprising a major proportion of a mineral lubricating oil and from about 0.05% to about 10% by weight of a nitrogen-containing composition prepared by the process which comprises forming an acylated amine by the reaction at a temperature of from about 100° C. to about 250° C. of from about 1 to about 5 equivalents of a polyethylene polyamine having up to about 11 amino groups with 1 equivalent of a high molecular weight carboxylic acid obtained by the reaction of a chlorinated polyisobutene having a molecular weight of from about 700 to about 5000 with acrylic acid and reacting said acylated amine with from about 0.1 to 2 equivalents, per equivalent of the high molecular weight carboxylic acid, of terephthalic acid at a temperature of from about 100° C. to about 250° C.

References Cited

UNITED STATES PATENTS

| | | | |
|---|---|---|---|
| 3,185,704 | 5/1965 | Kahn et al. | 252—51.5 X |
| 3,216,936 | 11/1965 | Le Suer | 252—51.5 X |
| 3,219,666 | 11/1965 | Norman et al. | 252—51.5 X |
| 3,298,955 | 1/1967 | Strang | 252—51.5 |

FOREIGN PATENTS

| | | |
|---|---|---|
| 1,367,939 | 6/1964 | France. |
| 983,040 | 2/1965 | Great Britain. |

DANIEL E. WYMAN, *Primary Examiner.*

PATRICK P. GARVIN, *Examiner.*